Figure 1:
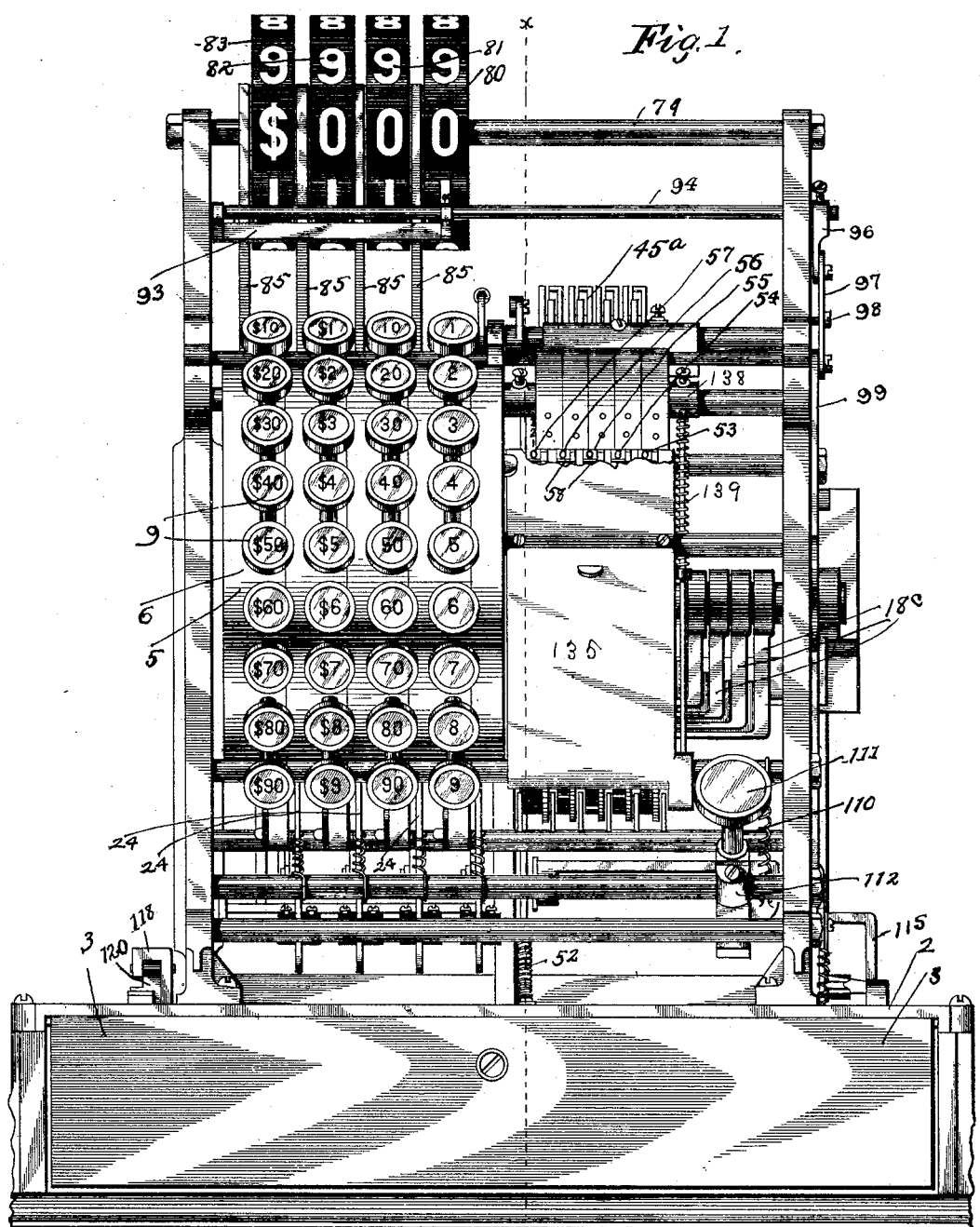

No. 704,795. Patented July 15, 1902.
H. S. HALLWOOD.
CASH REGISTER AND INDICATOR.
(Application filed Feb. 7, 1898.)
(No Model.) 9 Sheets—Sheet 1.

WITNESSES:
H. B. Bradshaw
J. H. Frank

INVENTOR
Henry S. Hallwood
BY
C. C. Shepherd
ATTORNEY

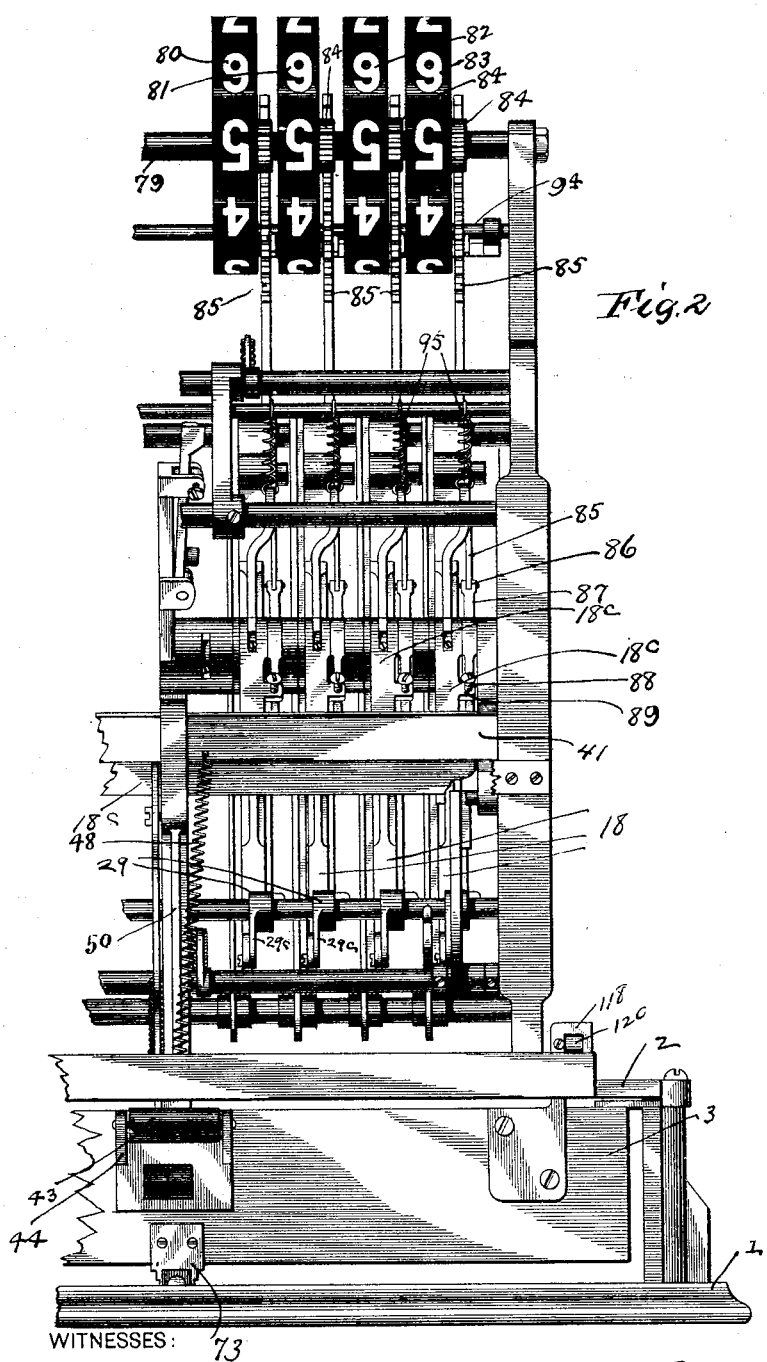

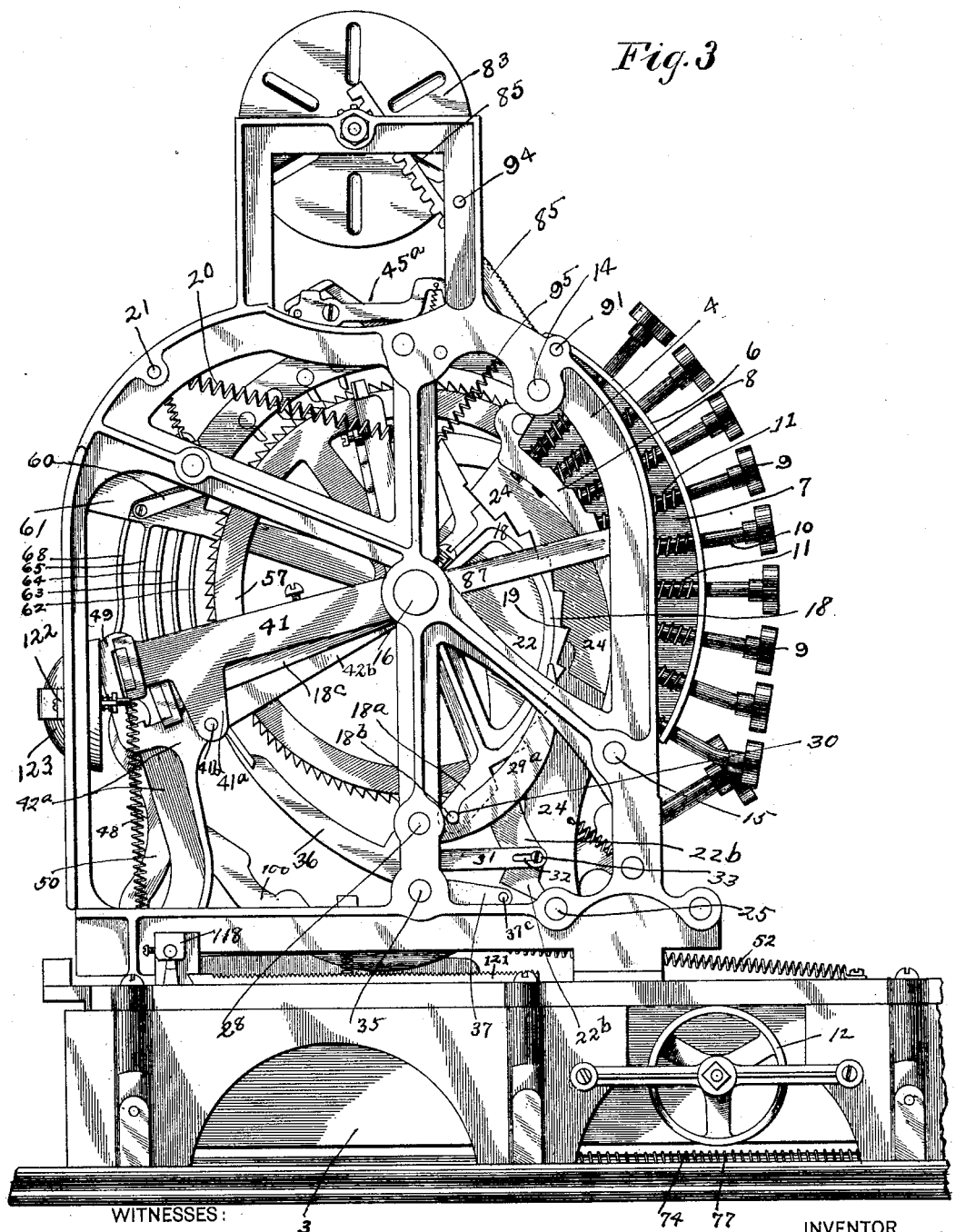

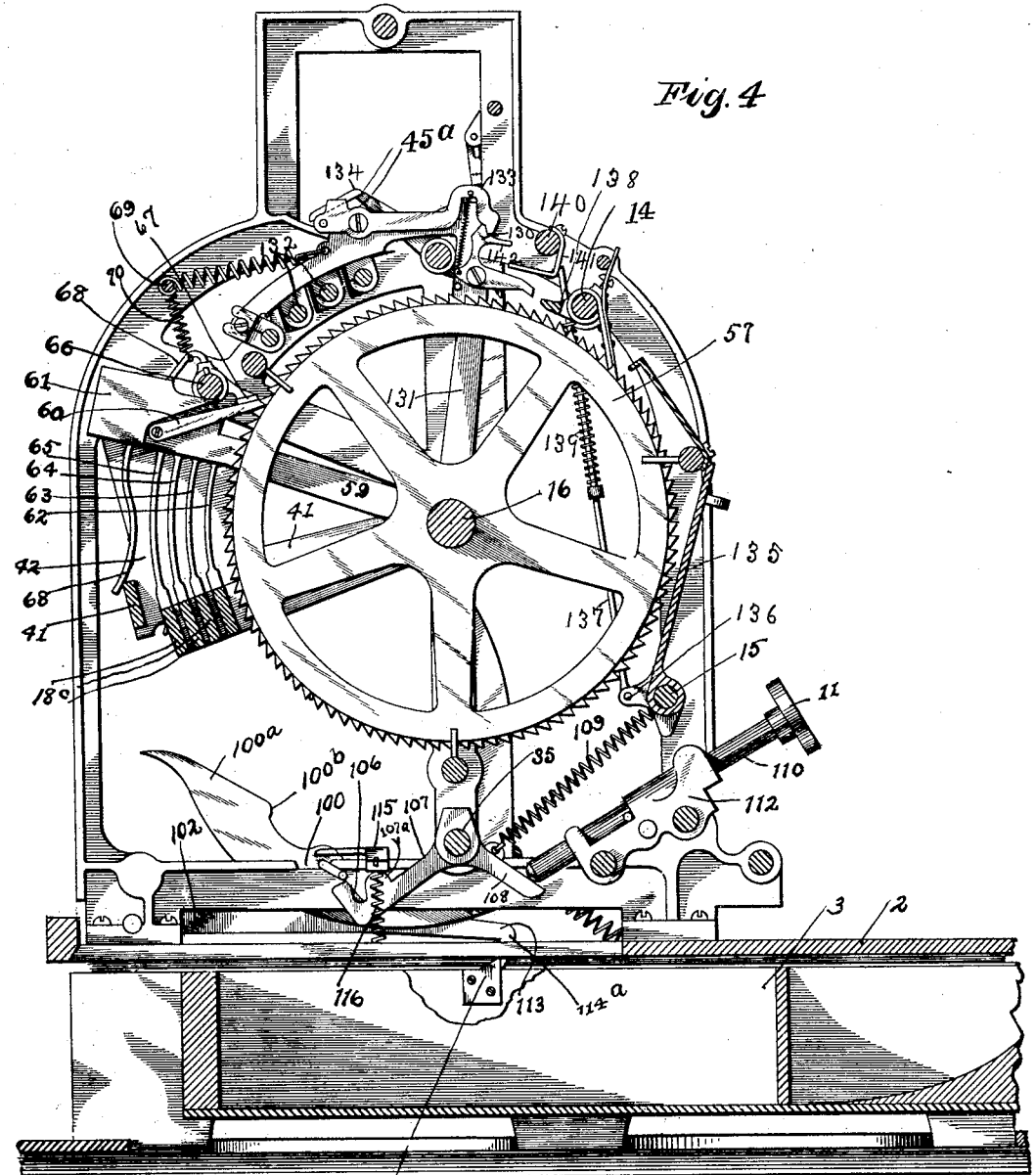

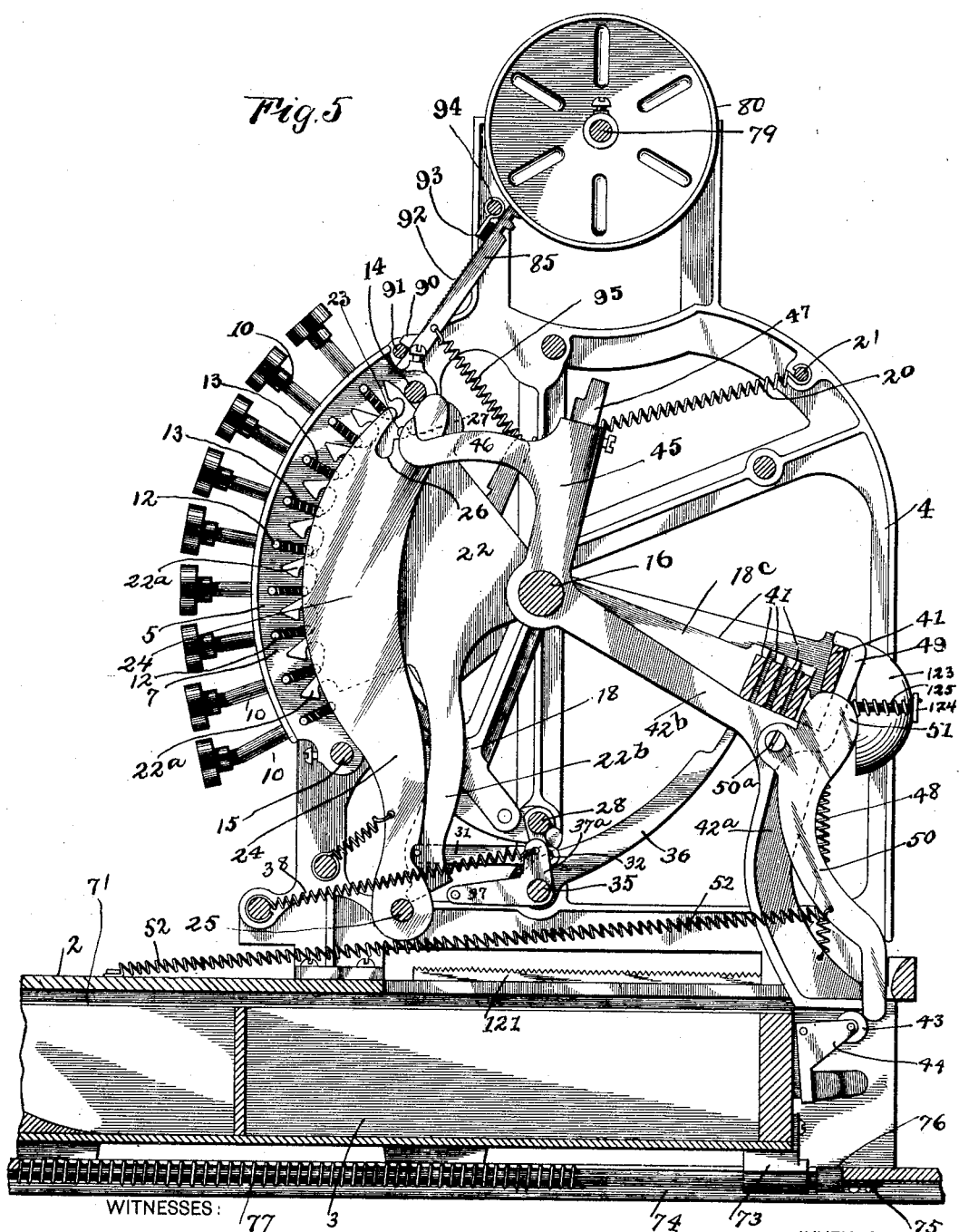

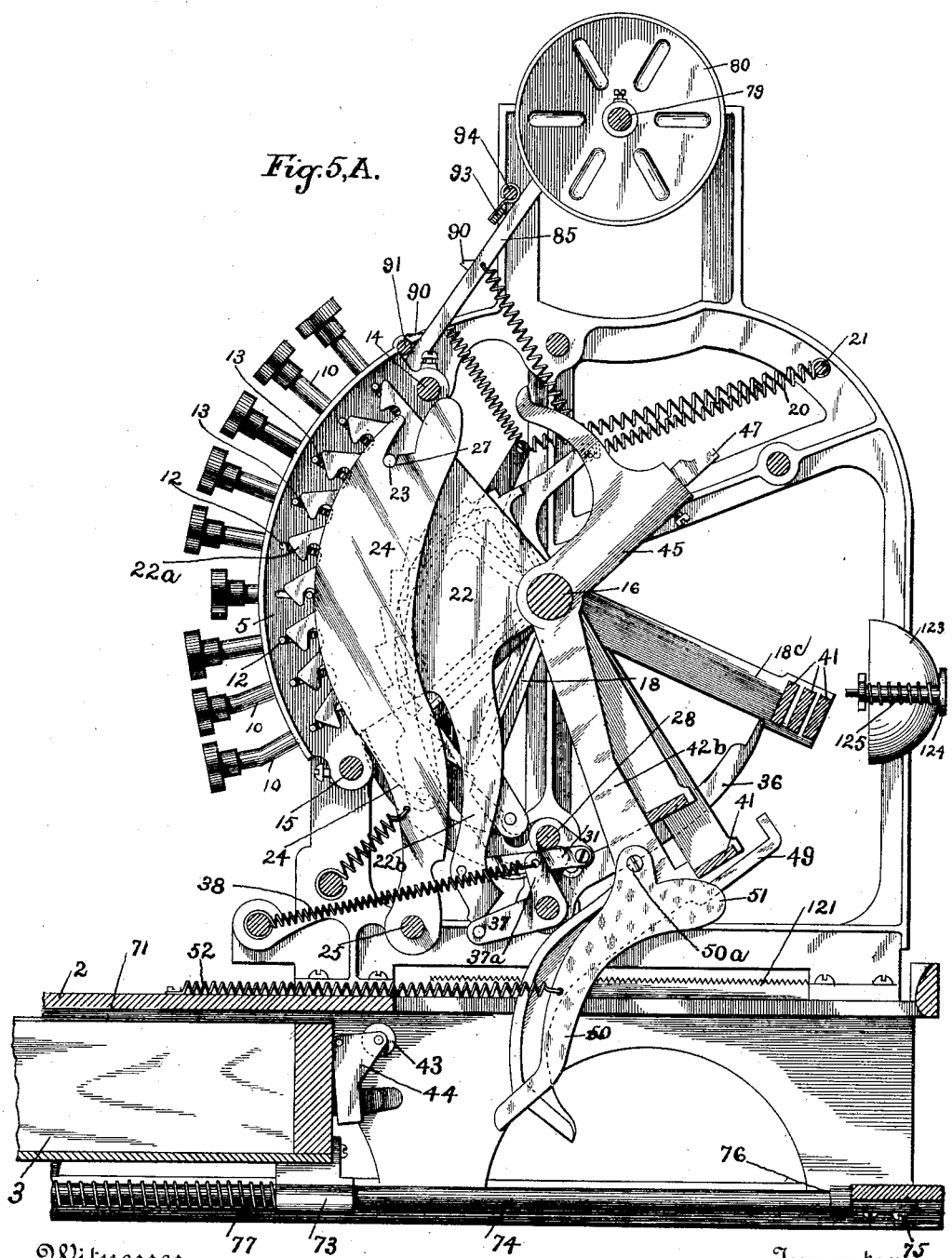

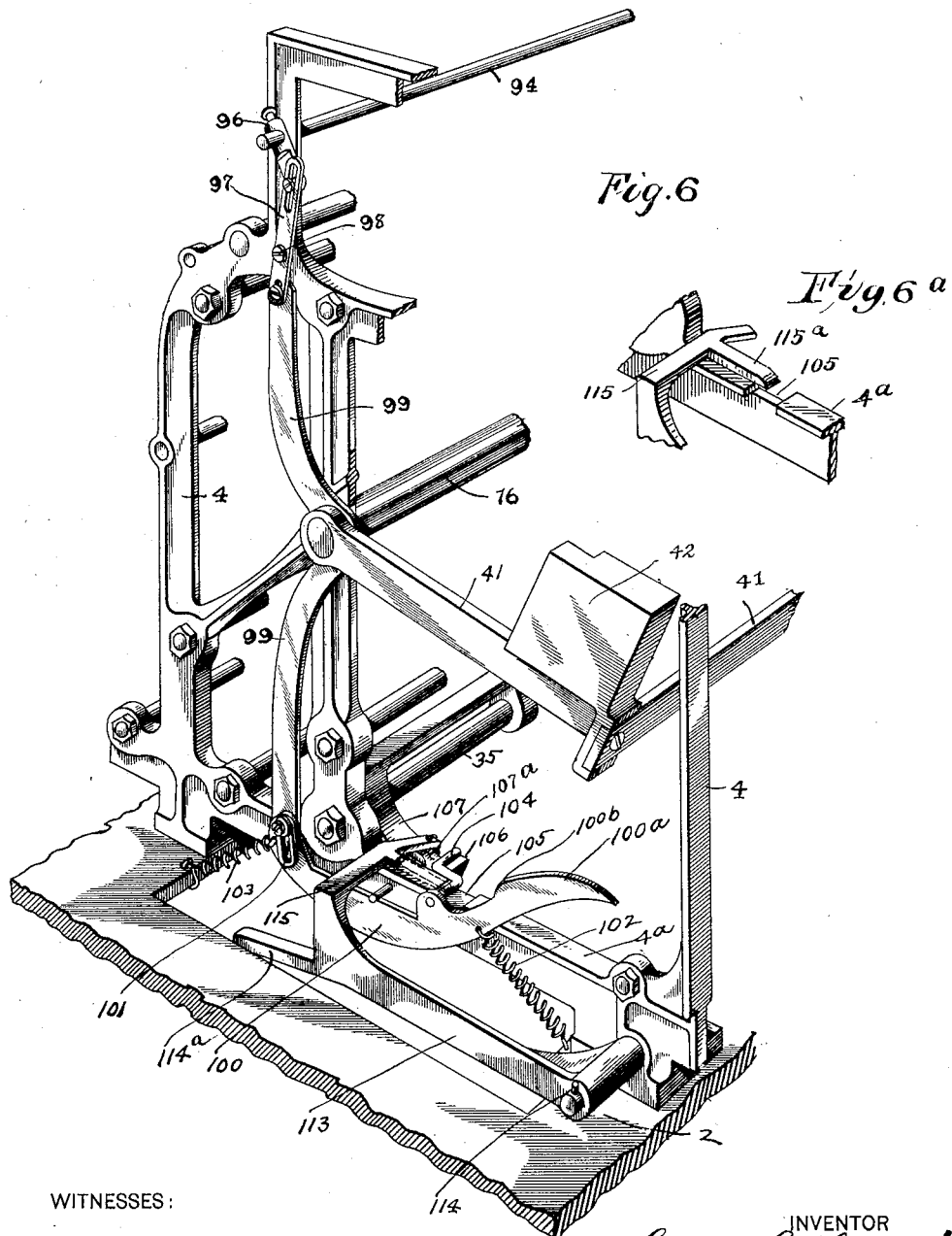

No. 704,795. Patented July 15, 1902.
H. S. HALLWOOD.
CASH REGISTER AND INDICATOR.
(Application filed Feb. 7, 1898.)
(No Model.) 9 Sheets—Sheet 8.
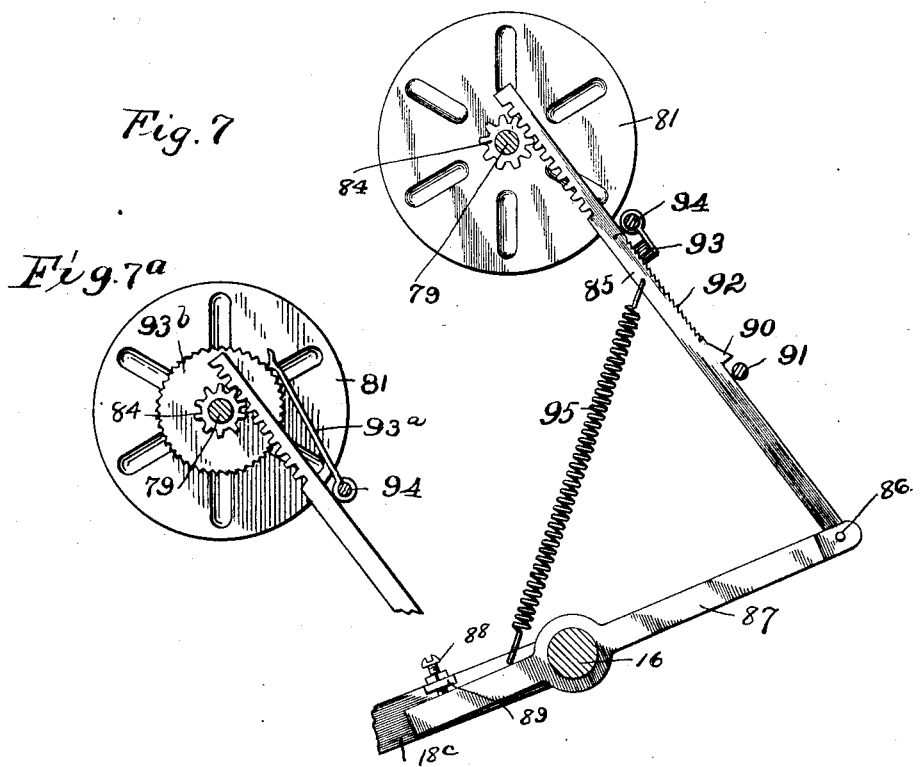
Fig. 7
Fig. 7a
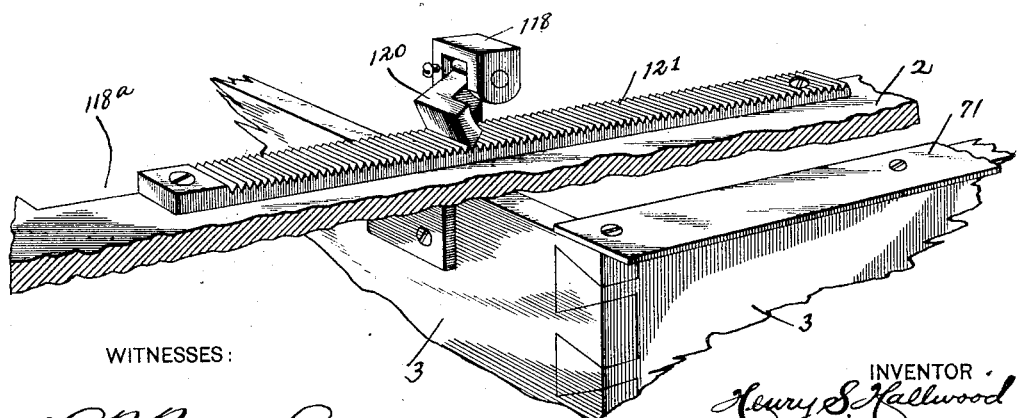
Fig. 8
WITNESSES:
H. B. Bradshaw
J. H. Frank
INVENTOR
Henry S. Hallwood
BY
C. C. Shepherd
ATTORNEY No. 704,795. Patented July 15, 1902.
H. S. HALLWOOD.
CASH REGISTER AND INDICATOR.
(Application filed Feb. 7, 1898.)
(No Model.) 9 Sheets—Sheet 9.
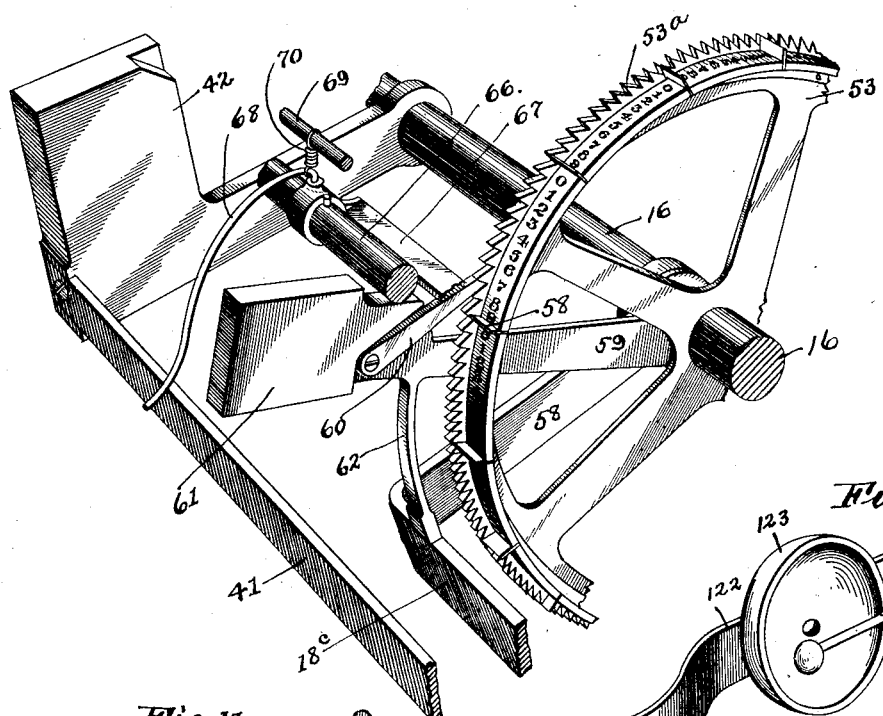
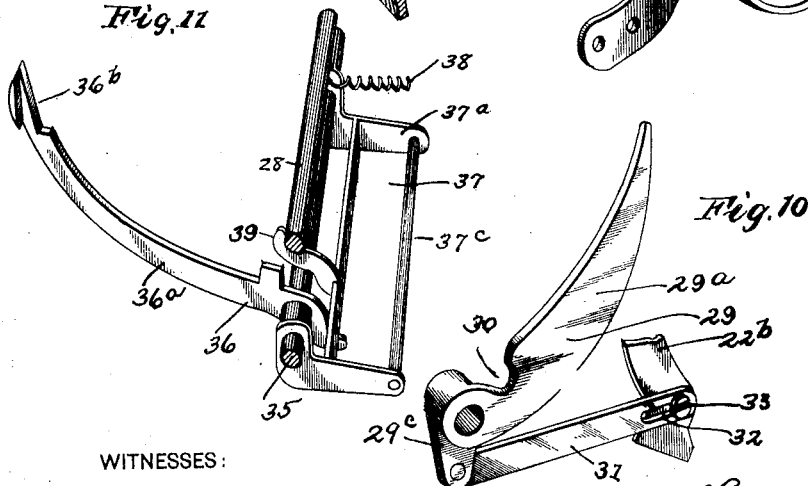
WITNESSES:
INVENTOR
Henry S. Hallwood
BY
ATTORNEY

UNITED STATES PATENT OFFICE.

HENRY S. HALLWOOD, OF COLUMBUS, OHIO, ASSIGNOR, BY MESNE ASSIGNMENTS, TO THE HALLWOOD CASH REGISTER COMPANY, OF COLUMBUS, OHIO, A CORPORATION OF OHIO.

CASH REGISTER AND INDICATOR.

SPECIFICATION forming part of Letters Patent No. 704,795, dated July 15, 1902

Application filed February 7, 1898. Serial No. 669,359. (No model.)

*To all whom it may concern:*

Be it known that I, HENRY S. HALLWOOD, a citizen of the United States, residing at Columbus, in the county of Franklin and State of Ohio, have invented a certain new and useful Improvement in Cash Registers and Indicators, of which the following is a specification.

My invention relates to the improvement of cash registers and indicators of that class wherein one or more cash-registering wheels are employed for the purpose of indicating and recording amounts of different denominations—such as dollars, dimes, and cents—in conjunction with a set of keys for each denomination, the amount registered or recorded by the registering-wheels being regulated by the particular key or keys of said sets depressed, and wherein indicators are provided which show the amount of the transaction.

My invention, however, has particular relation to the improvement of that class of cash register and indicator which is the subject of the patent to John H. McCormick, issued under date of October 27, 1896, and numbered 570,141.

The objects of my invention are to provide a cash-register of this class of superior construction and arrangement of parts; to provide improvements in the means for regulating and controlling the degree of movement of the registering-wheels; to provide means for positively limiting the degree of movement of the registering-wheels, thereby overcoming any tendency toward an excessive registration or overthrow; to prevent the setting of the parts for operation of the registering and indicating mechanism by depressing a key while the cash-drawer is open; to provide improved means for operating, controlling, and resetting the indicator-wheels; to provide improved means for preventing the closing of the cash-drawer before the same has been fully opened; to simplify the construction of the cash registering and indicating mechanism, particularly that shown in said former patent, and to produce other improvements in details of construction and operation, which will be more fully pointed out hereinafter.

These objects I accomplish in the manner illustrated in the accompanying drawings, in which—

Figure 1 is a front elevation of my improved register and indicator with the casing removed therefrom. Fig. 2 is a partial back view. Fig. 3 is a side elevation. Fig. 4 is a sectional view on line $x\ x$ of Fig. 1. Fig. 5 is a similar sectional view looking in the opposite direction. Fig. 5$^A$ is a sectional view of the machine, showing the drawer in the open position. Fig. 6 is a detail view in perspective of a portion of one end of the machine. Fig. 6$^a$ is a detail view in perspective, illustrating more clearly a portion of the mechanism shown in Fig. 6. Fig. 7 is a detail view in elevation of one of the indicator-wheel-operating bars. Fig. 7$^a$ shows a modified construction of the means for normally holding the indicator. Fig. 8 is a detail view in perspective of the device which I employ for preventing the closing of the drawer before the same is fully opened. Fig. 9 is a detail view in perspective of a portion of one of the registering-wheels and adjacent parts, showing the means employed for preventing the overthrow of said wheels. Fig. 10 is a detail view in perspective of a locking and releasing lever and its connections. Fig. 11 is a detail view in perspective of a lock-plate-resetting mechanism, and Fig. 12 is a similar view of an alarm-bell shown detached from the machine.

Similar numerals refer to similar parts throughout the several views.

In the construction of my improved register and indicator I employ a suitable frame or base, which consists of upper and lower plates 1 and 2, between which is supported and adapted to travel in the manner hereinafter described a cash-drawer 3. Upon the base is supported above the drawer the mechanism-containing frame, which may consist of the upright end frame-sections 4, which are connected at desirable intervals by transverse frame bars or rods. The form of this frame, however, is immaterial, and said frame may be shaped and arranged to best support the parts hereinafter described. Between the end frame-pieces 4 and preferably at one side of the center of the machine I provide a key-bearing frame 5, which consists of an external plate 6, which is preferably curved in the arc of a circle shown and which has formed therewith at intervals on its inner side inwardly-projecting wings or ribs 7, the inner edges of the latter being formed with laterally-projecting shoulders 8.

9 represents the keys, of which there may be one or more sets or series, the stems 10 of said keys passing loosely through the plate 6 and through openings in the shoulders 8 of the webs or wings 7. As indicated in the drawings, the key-stems of each set are arranged one above the other, the stems of each set gradually decreasing in length from the topmost to the lower stem. The outer end of each of the key-stems is provided with a suitable numbered head or button, which in this case represents money values, said buttons or heads being retained in their extreme outer position through the medium of springs 11, interposed between the shoulders 8 and plate 7. Each of the key-stems is provided, as shown more clearly in Fig. 5 of the drawings with a laterally-projecting stop-pin 12, these key-stems projecting loosely through or within radially-arranged slotted openings 13, with which each of the webs 7 of the key-frame is provided.

As indicated, the key-frame is supported in the above-described position through the medium of upper and lower transverse rods 14 and 15, which extend between the end frame standards. While any desired number of sets or series of amount-keys may be employed, I have shown herein four of such sets, the figures on the key heads or buttons of the right-hand set indicating amounts in cents from one to nine, inclusive, the next or second set indicating amounts in dimes from ten cents to ninety cents, the third set indicating the amounts in dollars from one to nine, and the fourth set indicating the amount in dollars from ten to ninety, said sets thus representing units, tens, hundreds, and tens of hundreds and the adjoining sets being separated by the webs 7 of the key-frame.

Through the central portion of the machine I provide a horizontal main shaft 16, upon which is mounted various parts of my device to be described hereinafter. Mounted to swing on the shaft 16, opposite each of the key sets, is a frame-segment 18, the rim of the latter being in the arc of a circle which is eccentric to the shaft 16, said rim being provided with successively-arranged notches or stop-shoulders 19. The upper end portion of each of the swinging segments 18 has connected therewith one end of a spring 20, the rear end of which is connected with a rear frame-rod 21, this spring exerting an upward and backward pull on said frame-segment. The lower end of each of these segments is provided with a rearwardly-inclined arm $18^a$, from which projects laterally a pin $18^b$. Each of the segments 18 is provided with a rearward extension in the form of a yoke-frame, these yokes being indicated at $18^c$. The side arms of the yokes which are not connected with the segments are hinged on the shaft 16 and these yokes forming, in conjunction with the shaft 16, oblong frames, the arms of which are normally parallel and the frames thus formed being graduated in size, so as to extend one within the other.

Mounted loosely on the shaft 16 and opposite the spaces between the sets of keys are key lock-plates 22. (See Figs. 3 and 5.) Each of these lock-plates, which is substantially of a battle-ax form, has the curved outer edge of its blade provided at intervals with hook-fingers $22^a$. In its upper end portion each of said lock-plates is provided with a laterally-projecting pin 23. 24 represents latch or releasing plates, the lower ends of which are fulcrumed on a frame-rod 25, one of these releasing-plates extending on one side of and adjacent to each of the lock-plates, the curved outer edge of said releasing-plates being located slightly in rear of the outwardly-projecting and beveled ends of the lock-plate hook-fingers. Each of the releasing-plates 24 is, as shown more clearly in Fig. 5, provided in its upper portion with a recess 26, the upper portion of which is enlarged to form a pin-bearing shoulder, (indicated in said view partly in full line and partly in dotted line at 27.) On this upper shoulder 27 normally rests the outwardly-projecting pin 23 of the adjoining lock-plate 22, the engagement of said pin and shoulder serving to normally hold the hook-fingers of the lock-plate above the paths of the laterally-projecting pins 12 of the key-stems.

Upon a horizontal shaft 28, which extends between the end frame-standards at a point in the lower portion thereof and in rear of the downwardly-extending arms $22^b$ of the lock-plates 22 I fulcrum separated segment-locking levers 29, the latter being substantially of a bell-crank form. (See Fig. 10.) The forward and heavier arm $29^a$ of each of these levers, which is curved and inclined upwardly, is provided on its upper side near its fulcrum-point with a notch or recess 30, with which by the means hereinafter described the pin $18^b$ of the adjoining segment-arm $18^a$ normally engages, as shown in Fig. 3. One of the levers 29 is provided for each of the lock-plates 22, and the downwardly-extending arm $22^b$ of each of the latter is jointedly connected with the shorter arm $29^c$ of the lever 29 through the medium of a bar 31, the forward end of the latter being provided with a longitudinal mortise 32, through which projects and within which is adapted to work a laterally-projecting pin 33 on the plate-arm $22^b$. The normal engagement of the pins $18^b$ with the notches 30 of the levers 29 is maintained through the normal elevation of the latch-plates 22, hereinbefore described. Upon a shaft 35, which extends beneath the shaft 28, is fulcrumed a trip and lifting lever 36, the rearwardly-extending and upwardly-curved arm $36^a$ of which is provided on its outer end with a vertical lateral shoulder 36ᵇ. The shorter and forwardly-extending arm of the lever 36 engages the underside of an inwardly-extending frame 37, the bell-crank-shaped inner end 37ᵃ of which is also fulcrumed on the shaft 35 and is retained in a depressed position through the medium of a spring 38, which connects said frame with a forward frame-rod of the machine. The frame 37 carries a horizontal rod 37ᶜ, which extends beneath the lower ends of the downwardly-extending plate-arms 22ᵇ. The frame 37 is provided with a rearwardly-extending hook-lug 39, which by contact with the shaft 28 is adapted to limit the downward movement of said frame 37.

Embracing loosely the outer side of the outer yoke-frame 18ᶜ I employ a yoke 41, the latter being provided on its rear side at one end with a suitable weight 42. The side arms of this upper weighted yoke 41 are swung on the shaft 16. One end of said yoke 41 is provided with a downwardly-projecting lug 41ᵃ, which has projecting inwardly therefrom a pin 41ᵇ, the latter extending within the path of the rear end of the lever 36 when the latter is depresed and when said yoke-frame is being moved upward.

42ᵇ represents an angular yoke-supporting lever, one arm of which is fulcrumed to the shaft 16 about midway of the center of the length of the latter. The rear and downwardly-extending arm 42ᵃ of the lever 42ᵇ is provided with a flattened lower side, which is adapted to normally bear upon a roller 43, which is journaled in a bracket 44, which projects from the back of the drawer 3. Above its fulcrum-point the lever 42ᵇ is provided with an upwardly-extending arm 45, the latter being provided in its upper portion with a forwardly-extending hook-finger 46. Above this hook-finger the arm 45 is provided with an extension 47. This upper arm 45, its finger 46, and extension 47, however, although shown in the drawings, are not regarded as an important part of my invention at this time, inasmuch as said parts are employed in the operation of a transfer mechanism by means of which amounts are transferred from one of the registering-wheels to another and finally to the total-wheel. Although I have shown a transferring mechanism in connection herewith, which is indicated generally at 45ᵃ, the particular form and construction of such mechanism is not a part of my present invention, substantially the same mechanism being shown in a former application of John H. McCormick and J. D. Morrison for cash registers and indicators, Serial No. 544,583, filed April 5, 1895. The foot or lower end portion of the lever-arm 42ᵃ is connected with the rear bar of the outer yoke-frame 41 by a coiled spring 48. The lever-arm 42ᵃ is provided with an upwardly-projecting and inturned hook extension 49, which normally engages the upper side of the rear bar of the yoke-frame 41.

50 represents a lever-arm, the upper and forward portion of which is fulcrumed at 50ᵃ to the upper portion of the lever-arm 42ᵃ. This lever-arm 50, which extends downward and outward, has its lower end portion normally in engagement with the rear side of the drawer-roller 43. The lever-arm 50 is provided on its upper end portion above its pivot-point with a rounded cam projection or extension 51, upon which is adapted to bear the rear arm of the weighted yoke 41. Through the medium of a spring 52 the lower portion of the lever-arm 50 is connected with the forward portion of the base-plate 2.

Upon the main shaft 16 is mounted loosely a set of registering-wheels 53, 54, 55, 56, and 57. The wheels 53, 54, 55, and 56 correspond, respectively, with the sets of keys 9 with respect to the value of the figures or numbers which are formed on the peripheries of said wheels, while the wheel 57 is a total-wheel, onto which is transferred in the manner hereinafter to be described the totals of the registrations shown by the remaining four wheels. With the exception of the total-wheel 57 the figures or numbers on the peripheries of each of said registering-wheels are arranged in ten sets or series, each series running from "0" to "9," inclusive, while the figures or numbers on said total-wheel run from "0" to "99." The numbers on the wheels 53, 54, 55, and 56 represent, respectively, cents, dimes, dollars, and tens of dollars, while the figures on the total-wheel indicate hundreds of dollars. Each of the registering-wheels is provided at one side of its numbered periphery with projecting teeth 53ᵃ, there being one hundred of these teeth for each of said wheels. Between each set of figures or numbers on each of the registering-wheels I provide a projecting stop-lug 58, these being shown more clearly in Fig. 9 of the drawings. Fulcrumed on the shaft 16 are the inner ends of rearwardly-extending pawl-carrying arms 59, there being necessary in this case four of said pawl-carrying arms, and each of said arms having fulcrumed thereto at a point in rear of the registering-wheels a forwardly-inclined pawl, said pawls being indicated at 60 and engaging, respectively, with the teeth 53ᵃ of the wheels 53, 54, 55, and 56. The outer end of each of the pawl-arms 59 is suitably weighted, as indicated at 61, while from the lower side of each of said weighted pawl-arms extends downwardly a stem or finger, these stems being indicated at 62, 63, 64, and 65 and shown in Fig. 4 of the drawings, these latter resting and bearing, respectively, on the rear arms or bars of the yokes 18ᶜ. Hinged on a horizontal rod 66, which extends over the upper sides of the pawl-arms 59, is a suitable latch-bar 67, the latter projecting on the forward side of said shaft 66 and resting on the upper sides of the wheel-operating pawls 60. This stop-bar is provided with a rearwardly and downwardly extending finger 68, the outwardly-curved lower end portion of which is normally in contact with the upper edge and rear side of the outer yoke 41. This finger is also connected in its upper portion with a rear and higher frame-rod 69 through the medium of a spring 70, which tends to exert a downward and forward pressure on the stop-bar 67.

Upon the top of each of the cash-drawer sides is secured, as indicated more clearly in Fig. 8 of the drawings, an outwardly-projecting plate 71. 72 represents bearing-wheels, these wheels being suitably journaled on opposite sides of the drawer in the base-frame, one of these wheels being clearly shown in Fig. 3 of the drawings. Upon these wheels bear the under sides of the outwardly-projecting portions of the drawer-plates 71.

Depending from the under side and rear portion of the cash-drawer, to which it is secured, is a suitable hanger or bracket 73, (shown more clearly in Fig. 5,) this bracket having extending loosely therethrough a horizontal rod 74, the rear end of which is secured to the base-plate at 75, the base-plate frame being provided on its inner side with a yielding bumper 76, with which the hanger 73 is adapted to come into contact when the drawer is closed. Between the drawer bracket or hanger 73 and the front end of the base-frame the rod 74 is surrounded by a coiled spring 77, which is adapted when the drawer is opened to compress between said hanger and front frame-piece. It will thus be seen that the cash-drawer is supported partly upon the wheels 72 and the rod 74.

The construction hereinbefore described relates more particularly, as will be shown by the description of the operation to be given hereinafter, to the means which I employ for producing a desirable operation of the registering mechanism, and I will now proceed to describe the construction and arrangement of the mechanism employed for producing a desirable operation of the target or indicating-wheels and for opening and normally retaining closed the cash-drawer.

Mounted loosely upon a rod or shaft 79, which extends between the upper portions of the end frame-standards and arranged adjacent to each other, are the desired number of indicator-wheels, of which there are in the present case four employed, one for each set or series of keys, said indicator-wheels being numbered, respectively, 80, 81, 82, and 83 and the numbers thereon representing, respectively, cents, dimes, dollars, and tens of dollars. These indicating figures or numbers, which are painted or otherwise made to appear on the peripheries of the indicator-wheels, run from "0" to "9," inclusive, on each of said wheels, with the exception of the wheel 83, on which the dollar-sign is substituted for the naught. As shown more clearly in Fig. 2 of the drawings, each of the indicator-wheels is provided with a central toothed hub or pinion 84, and with each of these wheels engage the teeth on the under side of a rack-bar 85, the latter extending forwardly and downwardly and having a jointed connection at its lower end, as indicated at 86 in Fig. 2 and in Fig. 7, with a rearwardly-extending bar 87. This bar 87 is fulcrumed on the main shaft 16 and has its arm or portion which extends in rear of said shaft normally in contact with the lower end of a set-screw 88, which extends downward through a lateral lug 89 on the adjoining frame-arm 18°. The downward movement of the rack-bars is limited by lugs 90 on said bars, which come into contact with the upper side of a horizontal frame-rod 91.

The forward or outer side of each of the rack-bars 85 has its surface above the stop-lugs 90 toothed or notched, as indicated at 92, and against the roughened surfaces of these bars thus produced is adapted to bear or bind the yielding lower face of a binding strip or frame 93, the latter being in the form of a bar which extends over the outer notched faces of the racks 85 and which is mounted on a horizontal shaft 94, the latter being journaled in the end frame-standards. Each of the rack-bars 85 is preferably connected with one of the segments 18 by a coiled spring 95, the latter serving to normally insure the retention of said rack-bars in their lower positions.

As shown more clearly in Fig. 6 of the drawings, one end of the shaft 94, on the outer side of one of the frame-standards, has secured thereto a short crank-arm 96, the projecting end pin of which engages loosely in a longitudinal slotted opening formed in the upper end of a bar 97, the latter being fulcrumed at 98 to the adjoining frame-standard 4. This bar 97 is also fulcrumed at its lower end to the upper end of a downwardly-extending lever 99, the latter being fulcrumed centrally on the outwardly-projecting end of the main shaft 16.

100 represents a trip-lever, which in its forward portion is jointedly connected with the lower end of the lever 99, this connection being effected, as indicated at 101 in Fig. 6, through the medium of a pin on one of said parts and a slot on the other, with which said pin engages. From its point of connection with the lever 99 the trip-lever 100 extends rearwardly and upwardly, terminating in an inclined or curved tongue 100ª, the production of the latter forming in front thereof a trip-lever shoulder 100ᵇ. This rear portion of the trip-lever is, through the medium of a spring 102, connected with the machine-frame, the spring imparting a slight downward pull. The forward end of the trip-lever is also connected with the machine-frame through the medium of a spring 103. The trip-lever 100 at a point near the center of its length is provided with an inwardly-extending pin 104, the outer portion of which normally engages with a recess or notch 105, formed in the upper side of the lower bar 4ª of the frame-standard, while the inner end portion of said pin is adapted to engage, as shown in said Fig. 6 and more clearly in Fig. 4, with the hook end of one arm 106 of a lifting-lever 107, which is fulcrumed on the shaft 35 and which has its remaining and forwardly-extending arm 108 normally elevated by a spring 109.

110 represents an inclined drawer-opening key-stem, which is adapted to be provided with a suitable head, which projects through the front casing of the machine near one side thereof. This key-stem is made to fit and slide in a suitable bearing-bracket 112, which is mounted on the lower front frame-rods of the machine. The inner and lower end of the key-stem 110 is retained in engagement with the upper side of the outer end portion of the lifting-lever arm 108, as clearly shown in said Fig. 4.

113 represents a drawer-latch, the rear end of which is fulcrumed at the rear portion of the machine on the outer side of one of the end standards, as indicated at 114 in Fig. 6. This drawer-latch has its forward portion provided with a laterally-extending arm 115, which, as shown in the drawings, bridges the upper side of the frame-standard bar 4ª and lever-arm 106, normally depressing the latter through the medium of a spring 116 by contact with a lug 107ª on the rear arm of the lever 107. (See Fig. 4.) The forward end portion of the latch-bar 113 is provided with a forward extension in the form of a hook or catch-arm 114ª, the latter being shown in Figs. 6 and 4 of the drawings. The extending arm 115 of the drawer-latch is preferably provided with a laterally-extending finger 115ª, as shown in dotted lines in Fig. 6 and in detail in Fig. 6ª. This finger 115ª lies above and substantially parallel with the frame-standard bar 4ª and is adapted to contact with the pin 104 as the pin is elevated out of the notch 105 in the manner hereinafter more fully set forth. The hook or downturned end of the catch extension 114ª of the bar 113 is adapted to engage with a lug 117, which is affixed to the cash-drawer 3. Owing to the downward pull on the latch-bar which is exerted by the spring 116 the catch-arm of said latch-bar is normally engaged with said drawer-lug, and the drawer is thus retained in a closed position.

In the drawings, and particularly in Fig. 8 thereof, I have illustrated the device which I employ for preventing the closing of the drawer until the same has been completely opened or opened to such degree as to cause the desired operation of the parts connected therewith or operated thereby. In accomplishing this object I secure to the rear portion of the cash-drawer a standard or bracket 118, which extends through a slotted opening in the base-plate 2, and in the upper and outwardly-extending portion of this standard is pivoted a depending dog 120. Upon the upper side of the base-plate 2, adjacent to and extending in the direction of the slot 118ª, I provide a rack-plate 121, with the toothed upper side of which is adapted to engage the pivoted dog 120. This dog is of greater length than the distance between its pivot-point and the rack 121, thus causing said dog to incline either rearwardly or forwardly when the rack is beneath the same. When rearwardly inclined, as shown in Fig. 8, it is obvious that an inward or closing movement of the drawer is prevented by an engagement of the rack-teeth with the dog, thus insuring the drawer being opened until the dog has passed over the front end of the rack before said drawer can be closed. In the closing operation it is obvious that the dog by contact with the rack will be inclined forwardly, and by its engagement with the teeth of the rack during the closing of the drawer this latter operation must be continued until the drawer is completely closed or until the dog has passed over the inner or rear end of the rack-bar.

Secured to the rear framework of the machine is a bell-supporting bar 122, upon which is mounted an alarm-bell 123.

124 represents a spring-actuated tapper-bar which is fulcrumed on a pin 125, which projects from said bar 122, said tapper-bar having its tapper end 126 normally retained out of contact with the bell by said spring. Projecting from the outer end of the tapper-bar is a trip-pin 127, the latter projecting within the path of the outer yoke-frame 41 when the latter descends or ascends in the manner hereinafter described.

In Fig. 7ª I have shown a modification in the means for normally holding the indicators. In this arrangement the holding devices are made in the form of springs 93ª, attached to the shaft 94; but instead of bearing on the notched rack-bar they are adapted to engage in the notched periphery of the disks 93ᵇ, forming a part of or secured to the indicator-wheels. When this arrangement is employed, the shaft 94, it will be understood, will turn in the opposite direction to tension the springs than when the serrations are formed in the racks, and to accomplish this the intermediate link 97, pivoted at 98, will be dispensed with, and the lever 99 will simply be extended upwardly and slotted to receive the pin in the arm 96. In other words, the pivot 98 will be dispensed with, and what is shown in Fig. 6 as a pivoted link 97 would simply be an extension to the arm.

In order to illustrate the operation of my improved register and explain the utility of the various parts which have been described herein, we will assume that the cash-drawer is closed, that the keys are in their outer positions, and that ciphers are shown on the front or exposed portions of the target or indicator-wheels with the exception of the wheel to the left, on which the dollar-sign appears. One of the keys in the tens-of-dollars series—for instance, the twenty-dollar key—being depressed, the lateral projecting pin 12 of said key-stem comes into contact with the forward curved edge of the adjacent latch-plate 24, forcing the latter back until the pin 23 of the adjoining lock-plate 22 has been disengaged from the shoulder 27 and dropped into the recess 26 of said latch-plate. The forward and downward swinging movement thus imparted to the lock-plate results in the engagement of one its hook projections $22^a$ with said pin 12, thus temporarily locking the key-stem in its depressed position. The movement imparted to the extension $22^b$ of the lock-plate above described results through the connection of said extension with the arm $29^c$ of the segment-locking lever 29 in releasing the locking-lever arm $29^a$, which drops by gravity from the pin $18^b$ of the adjoining segment 18. The cash-drawer is now opened, this being accomplished by pressing inward the releasing-key 110, causing, through the contact of said key-stem with the lever-arm 108, (see Fig. 4,) a depression of said forward lever-arm and a sufficient elevation of the rear lever-arm 107 to raise the pin 104 out of the frame-recess 105 and onto the upper side of said frame-arm. This upward movement of the lever-arm 107 also results in a raising of the spring-actuated arm 115 of the drawer latch-bar 113 and in a consequent disengagement of the hook end $114^a$ of said latch-bar with the drawer-lug. The drawer is now free to move outward to the open position, this movement being accomplished partially through the tension of the spring 52 and the engagement of the lever 50 with the roller 43 and partially through the weight of the rear arm of the outer yoke 41, which is supported upon the head or upper extension 51 of said lever 50. This outward or opening movement of the drawer not only results in a downward or swinging movement of the weighted outer yoke 41, but admits of that yoke $18^c$ which is connected with the released segment 18 dropping until that notch or shoulder of said segment which is designed to come into contact with the inner end of the twenty-dollar key-stem has engaged therewith. Owing to the fact that the stem 65 of the pawl-arm 59, the pawl of which engages with the teeth of the tens-of-dollars wheel, is dependent upon said yoke-frame $18^c$ for support, it is obvious that the dropping of this yoke-frame above described must result in a dropping of said pawl-carrying arm, and owing to the further fact that said yoke-frame is, through the engagement of the key-stem with the proper segment-notch, limited in its movement to a predetermined distance said pawl 60 drops downward over two teeth of the registering-wheel 56. By the pawl thus engaging the second tooth below its former position it is obvious that the registering-wheel 56, or that wheel which registers the tens of dollars, will when said pawl is moved upward to its original position be rotated a distance equal to two of its teeth. As each of the teeth on said wheel represents ten dollars, it is obvious that said wheel at the point of its exposed periphery will indicate a registration thereon of twenty dollars.

When the pin 104 (see Fig. 6) is in engagement with the frame notch or recess 105 prior to the opening of the drawer, the trip-lever 100 is retained in its rearmost position and the lever 99 is retained in a substantially vertical position, resulting through the connections of said lever with the rod 94 in the binding-strip 93 being pressed into engagement with the toothed outer faces of the rack-bars 85. When the drawer is opened, however, in the manner hereinbefore described and the pin 104 is released from its engagement with the frame-notch and moved by the spring 103 to a forward position, the upper portion of the lever-arm 99 is moved slightly to the rear, resulting in a disengagement of the binding-strip 93 and rack-bars. The forward movement of the trip-lever 100 also carries the pin 104 between the finger $115^a$ and the top of the frame-bar $4^a$, so that the drawer-locking lever is held out of the locking position until these parts have been returned to their normal positions by the upward movement of the yoke 41. In the downward movement of the yoke-frame $18^c$, before referred to, its set-screw 88 (see Figs. 7 and 2) comes into contact with the adjacent arm of the bar 87, depressing said bar-arm and causing through its connection with the outer or left-hand rack 85 a sufficient downward movement of the latter to rotate the indicating-wheel 83 until the figure "2" is exposed on the front of said wheel, this figure, in connection with the three ciphers at the right thereof on the remaining indicating-wheels, indicating the amount, twenty dollars.

The downward movement of the outer weighted yoke-arm 41, which is occasioned by the opening of the drawer and the consequent release of the support of said yoke, results by contact with the tapper-arm pin 127 in tripping said tapper-arm and causing a stroke of its hammer against the bell. By coming into contact with the curved tongue extension $100^a$ of the spring-actuated trip-lever 100 the weighted yoke-bar 41 is cushioned against the jar or jolt which might otherwise be occasioned by the sudden stopping of said weighted yoke in its downward movement. This contact of the yoke and trip-lever tongue continues until the upper edge of the rear bar of said yoke has engaged with the trip-lever shoulder $100^b$.

When the drawer is moved to the open position, hereinbefore described, it is evident that the spring 77 will, by contact with the bracket or hanger 73, be gradually compressed, said spring thus being made to cushion the drawer against the effects of a sudden stoppage in its movement. The above operations having taken place, the drawer is now forced to its inner or closed position. In the beginning of this inward movement of the drawer it is obvious that the arm 50, upon which the weighted yoke 41 is supported, will be moved upward sufficiently to release the engagement of said yoke with the shoulder 100$^b$ of the trip-lever 100. The depression of the tongue portion 100$^a$ of said trip-lever thus caused by the yoke passing over said tongue in its upward movement results in drawing the pin 104 again into engagement with the notch 105 of the frame-bar 4$^a$ and in the binding-strip 93$^a$ again engaging with the toothed outer surfaces of the bars 85. In this manner the indicator-wheels are retained in position to indicate the amount of the last purchase. It is obvious that the closing of the drawer must also result in a reëngagement of the hook-finger 114 of the latch 113 with the drawer-lug 117.

As the drawer is moved inward and is approaching the closed position the pin 41$^b$ of the weighted arm 41 (see Figs. 3, 10, and 11) comes in contact with the upper side of the arm 36$^a$ of the lever 36, depressing said arm 36$^a$ and raising the forward arm of the lever 36 until the front rod 37$^c$ of the frame 37 presses the extension 22$^b$ of the lock-plate 22 upward until the hook-finger 22$^a$ of said lock-plate is released from engagement with the lateral pin 12 of the twenty-dollar key-stem, allowing the latter to spring outward to its normal position and again causing the engagement of the pin 23 with the shoulder 27 of the adjoining latch-plate. Inasmuch as there is imparted to the weighted arm or yoke 41 an additional movement by the cam 51 on the lever 50 by its contact with the roller 43 in the last movement of the drawer and after the other yokes have been brought to their proper position while the roller travels along the straight bottom of the arm 42$^a$, as shown in Fig. 5, this releasing of the keys caused by the contact of the pin 41$^b$ with the arm of the lever 36 will take place the last thing and after the other parts have been brought to their normal positions. It is obvious that the operation last described will apply to all of the depressed keys, inasmuch as the frame-rod 37$^c$ operates to lift all of the previously-lowered lock-plates. When the lock-plate is raised in the manner above described and the forward end of the bar 31 is thus drawn forwardly, it is obvious that the catch-arm 29 will be raised until its notch 30 is again in engagement with the pin 18$^b$ of the adjoining segment, thus locking said segment against movement until released in the manner hereinbefore described. In order, however, to cause the above-described locking of the segment, it is obvious that the latter must have been returned to its normal position. This is accomplished also through the closing of the drawer, owing to the fact that the yoke 18$^c$, with which said segment is formed or connected, is raised through the lifting action of the lever 42$^b$, which is caused by a contact with the roller on the rear portion of the drawer.

It has been shown that by the opening of the drawer the pawl-carrying arm 59, with which is connected the stem 62, has been lowered until its pawl 60 has dropped over two teeth of the wheel 56. It is thus evident that the closing of the drawer, and the consequent lifting of said pawl-arm to its former position, has resulted through the engagement of said pawl and the teeth of said wheel 56 in the latter being moved the distance of two of said teeth, thus indicating by reference to the numbers on the face of said wheel a registration of twenty dollars. In order to avoid any tendency of an overthrow of the registering-wheels or toward the same through shock or otherwise being rotated past the desired point, I have provided the fulcrumed frame or bar 67, with the under side of which the pawls 60 come into contact at their upper limit of movement, in the manner indicated more clearly in Fig. 9 of the drawings. This stop bar or frame 67 is prevented from being elevated by contact with the pawls through the engagement of its finger 68 with the rear bar of the weighted yoke 41.

It is evident that when a key is again depressed and the drawer again opened the operations hereinbefore described will be repeated. Although I have described the operations which take place when one of the keys is depressed, it will readily be seen that this description may be applied to the parts connected with or acted upon by keys of either the cents, dimes, or dollars series.

Owing to the fact that the lever 50 is provided with the upwardly-extending cam-shaped projection 51, upon which is supported the weighted yoke 41, it is obvious that said yoke-frame will be carried, as desired, to an increased height. This increased or additional elevation of said frame 41 is accomplished after the lever-arm 42$^b$ has carried the yoke 18$^c$ and segment-pin 18$^a$ to their normal positions and insures the disengagement of the yoke-frame from the trip-arm 36. It will also be seen that although the depression of one of a set or series of keys prior to the opening of the drawer results in disengaging the corresponding segment from the corresponding lever 29 it is obvious that when said drawer is opened the released or disengaged segment is moved forwardly and upwardly until its pin 18$^b$ is in position to come into contact with the upper side of said lever-arm 29$^a$ in case another key of the same set or series is depressed, thus resulting in locking all the remaining keys of said set against depression. This contact of the lever-arm 29$^a$ and the segment-pin whereby the locking of the remaining keys of the set is accomplished is the result of the following operation: When said second key of the set is depressed and its laterally-projecting pin contacts with the inclined face of the corresponding hook of a lock-plate 22, it is obvious that said lock-plate will have imparted thereto a swinging movement, whereby the lower end or extension of said lock-plate is moved forwardly. This forward movement of said lock-plate extension 22$^b$ results, through its engagement with the bar 31, in the latter being drawn forward and by such forward movement and by its jointed connection with the lever-arm 29$^c$ in the arm 29$^a$ being caused to swing upward until its upper side or edge contacts with the pin 18$^b$ of the corresponding segment. In this manner the upward movement of the lever 29 is so limited as to prevent the laterally-projecting pin 12 of the second key depressed from engaging the hook-finger 22$^a$ of the lock-plate. The limited movement of the key above described is not sufficient to move the lock-plate out of engagement with the laterally-projecting pin of the first key depressed. It will be understood that the lever-arms 29 are normally held in their position by the link 31 engaging the extension 22$^b$ of the locking-plate. The pins 18$^b$ on the segments while they normally rest within the notch 30 do not contact with the shoulder or side of this notch, so that the arms 29 are free to drop by gravity when the parts are in their normal positions. As soon, however, as the drawer is opened and the denominational yokes released by the dropping of the outer weighted yoke 41 then the pins will be forced against the front side of the notches 30 in each of the levers 29. The contact of the segment-pin with the forward side of the lever-notch is such as to prevent the levers 29 from dropping even though they may be released by the movement of the extension 22$^b$ on the locking-plates. The bar 31, however, being slotted, these locking-plates may be moved without disengaging the levers 29 from the pins in the notches 30. The result of this construction is that all the keys except that set or series in which a registration has been made are unlocked and can be moved at will; but a movement of the keys produces no effect except to move the locking-plate and its pin 33 in the slotted opening 32, the levers 29 being held in their upward position and the denominational yokes locked thereby by the hooking of the pin 18$^b$ in the notches 30.

By the mechanism and operation previously described herein it will readily be seen that positive means are provided whereby the release of the indicating-wheel-operating racks and the operation of said indicating-wheels are effected simultaneously with the opening of the drawer and that the rack binding or locking strip closes an engagement with said rack-bars at the first movement imparted to the drawer in the closing operation. To insure this simultaneous release of the drawer and indicator-wheels, I have provided the lever 107 with the lug 107$^a$, which by contact with the latch-arm 115 operates to raise the latch-bar from engagement with the drawer-lug simultaneously with the raising of the pin 104, through which motion the release of the indicator-wheels is effected, as described.

By suitable transferring mechanism, which may be substantially the same as that shown in the former patent referred to, I am enabled to transfer amounts registered on the cents-wheel to the dimes-wheel, thence to the dollars-wheel, thence to the tens-of-dollars wheel, and finally to the total-wheel; but the character of this transferring mechanism does not form a part of my present invention. I have, however, provided means for lifting the transfer-pawls off of their respective register-wheels in case it is desired to set the register-wheels to zero, this means being illustrated in Fig. 4 of the drawings. As is fully set forth in the McCormick and Morrison application and the patent to McCormick, previously referred to, the transfer-pawls 130 are carried on arms 131, which are pivoted upon the shaft 16 and at each operation of the machine are rocked back and forth by the rock-shafts 132 a distance corresponding to one of the teeth 53$^a$ of the register-wheels. These shafts, it will be remembered, are rocked to effect this movement of all the transfer-pawls when the drawer is opened. The pawls are normally held out of contact with their respective register-wheels by means of retaining-hooks 133, which are also carried on the arms 131 and which engage with the transfer-pawls. These hooks are lifted to release the pawls by the depression of the rear end of the lever 134 by the projecting stop-lugs 58 on the register-wheels. This structure and operation forms no part of my present invention, and is thus briefly referred to only as introductory to the description of the means for lifting the transfer-pawls when the register-wheels are to be reset to zero.

The register-wheels are concealed from view principally by the lid 135, which, as shown in Fig. 4, is pivoted to the frame-rod 15, and they can be reached only through that portion of the casing which is closed by this lid. When it is desired to reset the register, the lid is turned downwardly about the frame-rod, when the wheels may be turned by hand. Bearing in mind that the transfer following the registration of one transaction does not take place until the drawer is opened to effect the next registration, it will be evident that one or more of the transfer-pawls may have been tripped, and, if this is the case, they will be in position for transferring when the register-wheels are reset. If such is the condition, it will be seen that when the drawer is opened again after the register has been reset all these pawls will turn their register-wheels and a false registration will be made. It therefore becomes necessary to provide some means for lifting these pawls when it is desired to reset the register to zero. To accomplish this, I form the hub of the lid 135 with an inwardly-projecting arm 136, to which is pivoted an upwardly-extending rod 137. This rod passes through and is guided by a stationary lug 138 on the frame-rod 14. Between this lug and a collar on the rod is a coiled spring 139, which surrounds the rod and exerts a downward pressure on the same in order to hold the lid 135 closed.

140 is a rod which is journaled in the frame of the machine and which is provided with an angular plate 141, arranged in front of the transfer-pawls 130. The upper end of the rod 137 terminates at this plate, and it is so positioned with reference to the same that when the rod is lifted by the opening movement of the lid 135 the angular plate 141 will be rocked backwardly and caused to rotate the rod 140. This will bring the inner edge of the angular plate into engagement with fingers 142, projecting forwardly from the transfer-pawls, and will lift said pawls from their register-wheels and into engagement with their retaining-hooks 133. It is evident that if the register-wheels are now reset to zero the machine will give a correct registration when it is next operated. The lid 135 therefore not only conceals the register-wheels, but also controls the transfer devices.

From the construction and operation herein described it will readily be seen that improved means are provided for producing a positive operation of the registering and indicating wheels, that the mechanism employed for this purpose contains comparatively few parts, and that said parts are so arranged and combined as to avoid any tendency toward their readily getting out of order or becoming inoperative. It will also be seen that simple and effective means are provided for preventing the overthrow of the registering-wheels, for cushioning the various parts of the machine against the results of shocks, which ordinarily follow hasty operations, and that a machine constructed in the manner herein described may be produced at a reasonable cost of manufacture.

Having now fully described my invention, what I claim, and desire to secure by Letters Patent, is—

1. In a registering-machine, the combination of a key, a lock-plate for holding said key when fully depressed, and a latch for normally holding said lock-plate out of operative position, said latch being adapted to be tripped by the key to permit the lock-plate to operate, substantially as described.

2. In a registering-machine, the combination of a key, a pivoted lock-plate for holding said key when fully depressed, and a pivoted latch-plate for normally holding the lock-plate out of operative position, said latch-plate being adapted to be tripped by the key to permit the lock-plate to operate, substantially as described.

3. In a cash-register, the combination with a registering mechanism, a set or series of amount-keys and means whereby the degree of movement of said registering mechanism is controlled by the key depressed, of a fulcrumed lock-plate adjacent to the stems of said keys, a fulcrumed latch-plate adjacent thereto and means whereby the contact of a depressed key or projection thereof with said latch-plate causes said lock-plate to lock said key when fully depressed, substantially as and for the purpose specified.

4. In a cash-register, the combination with a registering mechanism, a key-frame and a set or series of amount-keys arranged therein, and a fulcrumed lock-plate adjacent to said key-stems having projecting hook-fingers adapted to be engaged with projections on the adjacent key-stems when the latter are depressed and a pin 23 projecting from said lock-plate, of a fulcrumed latch-plate adjoining said lock-plate with which said key-stem projections are adapted to contact when the keys are depressed, a recess 26, a shoulder 27 in said latch-plate, said lock-plate pin 23 adapted to be disengaged from said shoulder 27 and engaged in the recess 26 by the depression of one of said keys, substantially as and for the purpose specified.

5. In a cash-register, the combination with a registering mechanism, a sliding cash-drawer, a set or series of amount-keys and means whereby the extent of operation of said registering mechanism is controlled by the key or keys depressed, a toothed or notched lock-plate fulcrumed adjacent to said key-stems and means for dropping the latter into engagement with said key-stems when the latter are depressed, of a hinged or fulcrumed lifting-frame 37, a lever-arm 36 connected with said lifting-frame and means whereby the closing of said drawer produces a depression of said lever-arm and a lifting or unlocking influence of the frame 37 on the previously-lowered lock-plate, substantially as and for the purpose specified.

6. In a cash-register, the combination with a registering mechanism, a cash-drawer, a set of amount-keys for controlling the degree of operation of said registering mechanism and a lock-plate and means for dropping the latter into engagement with a depressed key, of a fulcrumed lifting-frame beneath said lock-plates, a lever-arm connected therewith, a fulcrumed frame-yoke 41 adapted to be raised by the closing of said cash-drawer and adapted in raising to contact with said lever-arm and produce an elevation of said lock-plate, substantially as and for the purpose specified.

7. In a cash-register, the combination with a set of registering-wheels, a key-frame and a set or series of keys in said frame for each of said registering-wheels, a fulcrumed lock-plate adjacent to each set of key-stems, said lock-plate adapted to drop downward and engage with a depressed key, and a fulcrumed bell-crank 29 having one of its arms jointedly connected with the lowered lock-plate, and having its forward arm curved upward and provided in its inner end portion with a notch, of a fulcrumed frame for each of said key sets or series, each frame consisting of toothed segment portion having a laterally-projecting pin adapted to contact with the curved arm of said lever 29, and a yoke portion, said segment having its toothed portion on an arc eccentric with its shaft and normally prevented from movement by engagement with one arm of said bell-crank, and means whereby the dropping of said lock-plate releases said bell-crank arm from engagement with the segment, substantially as and for the purpose specified.

8. In a registering-machine, a registering-wheel, a pawl for turning said wheel, and means for operating said pawl, a stop-plate, and means for moving said stop-plate into the path of the pawl when said pawl-operating means approaches the limit of its movement, substantially as described.

9. In a cash-register, the combination with a set of toothed registering-wheels, a fulcrumed pawl engaging the teeth of each wheel, a cash-drawer, a yoke-frame 41 adapted to be swung upward by the closing of said drawer and means for dropping said pawls down over a predetermined number of registering-wheel teeth, of a fulcrumed stop-bar 67 and a finger extending therefrom, said stop-bar contacting with and limiting the upward movement of said pawls when the frame 41 is raised to contact with said finger, substantially as and for the purpose specified.

10. In a cash-register, the combination with a registering mechanism, a set of amount-keys for controlling the operation of said registering mechanism and a cash-drawer, the opening of which sets the registering mechanism for operation and the closing of which completes said operation, of a fulcrumed lever $42^b$, a lever-arm 50 fulcrumed thereto and normally bearing against the drawer and a spring 52 connecting said lever-arm with the machine-frame, substantially as and for the purpose specified.

11. In a cash-register, the combination with a set of toothed registering-wheels, amount-keys, a cash-drawer, an operating-pawl for each of said registering-wheels, a set of pawl-operating swinging frames $18^c$ and means for controlling the degree of movement of the same, of a fulcrumed lever $42^b$ normally supporting said frame $18^c$ and a spring-actuated lever-arm 50 fulcrumed to said lever and exerting an opening-pressure against said drawer, substantially as and for the purpose specified.

12. In a cash-register, the combination with a registering mechanism, a set of amount-keys for controlling the same, and a cash-drawer, of a fulcrumed lever $42^b$ and a lever-arm 50 fulcrumed thereto, the latter normally exerting a pressure against the cash-drawer, a fulcrumed frame 41 supported upon said lever-arm and adapted to follow the same and a spring 52 connecting said lever-arm and machine-frame, substantially as and for the purpose specified.

13. In a cash-register, the combination with a set of toothed registering-wheels, amount-keys, cash-drawer, an operating-pawl for each of said wheels, a set of pawl-operating swinging frames $18^c$, a swinging frame 41 and means whereby the opening and closing of the cash-drawer produces a downward-and-upward swinging movement of said frames, of fulcrumed arms $29^a$ adapted to lock said frames $18^c$ when the drawer is closed and to disengage therefrom when the drawer is open and a trip-arm 36 adapted to contact with the frame 41 and move said arms $29^a$ into locking engagement with the frames $18^c$, substantially as and for the purpose specified.

14. In a cash-register, the combination with the framework, a registering mechanism, a drawer and a drawer-releasing key, a latch-bar 113 adapted to engage the drawer when closed and having a spring-actuated arm 115, of a fulcrumed lever 107 disconnected from said latch-bar and having one of its arms in contact with said drawer-releasing key and its remaining arm adapted to raise the arm 115 of said latch-bar by contact with the latter when said key is depressed, substantially as and for the purpose specified.

15. In a cash-register, a key, means for locking said key, a cash-drawer, a register-wheel, means for turning said wheel, a lifting-frame for said locking means, and connections between said frame and drawer whereby the former is lifted to unlock the key when the drawer is pushed in and after the register-wheel has ceased turning, substantially as described.

16. In a cash-register, a key, means for locking said key, a cash-drawer, a register-wheel, a frame $18^c$ controlled by the key for turning said wheel, a second frame 41, means for lifting said frames when the drawer is pushed in, a device connected with said second frame for unlocking the key, and means for giving said second frame an excess of movement after the first frame and the register-wheel have come to rest for the purpose of unlocking the key, substantially as described.

17. In a cash-register, the combination with a pawl-operated registering mechanism, a set of pawl-operating frames $18^c$ and a swinging frame 41, a cash-drawer, a fulcrumed lever 42 supporting said frames $18^c$, a lever-arm 50 pressing the drawer and fulcrumed to said lever $42^b$, an upper extension 51 on said lever-arm upon which said frame $42^b$ rests and by means of which the frame 41 is lifted above the frames $18^c$ when the drawer is closed, substantially as and for the purpose specified.

18. In a cash-register, a drawer, a key for releasing said drawer, a normally-locked indicator, means for releasing the said indicator when the said key is depressed, and means for locking the indicator when the drawer is pushed inward, substantially as described.

19. In a cash-register, an indicator, means for setting said indicator, a drawer, a releasing device for said drawer, means controlled by the drawer for locking the indicator, and means controlled by the releasing device for unlocking the same, substantially as described.

20. In a cash-register, an indicator, means for setting said indicator, a spring-actuated rock-shaft, a device on said shaft for locking the indicator in its set position, a cash-drawer, means controlled by said drawer for rocking said shaft in one direction against the tension of its spring to lock the indicator, and a key for releasing said shaft to permit it to rock in the opposite direction so that the said device will unlock the indicator, substantially as described.

21. In a cash-register, the combination with a frame, a registering mechanism, cash-drawer, rotary indicator or target wheels, rack-bars for operating the same, swinging frames 18ᶜ, means for operating the latter by movement of the drawer and for contributing motion from said frames to said indicator-wheels through said rack-bars, of a hinged binding-strip 93 adjacent to said rack-bars, a drawer-releasing key and means whereby the operation of said key disengages the binding-strip and rack-bars and whereby the engagement is resumed by the closing movement of the drawer, substantially as and for the purpose specified.

22. In a cash-register, the combination with a frame, a registering mechanism, a cash-drawer, indicator-wheels, rack-bars for operating the same, swinging frames 18ᶜ, means for operating the latter by movement of the drawer and for contributing motion from said frames to said indicator-wheels through said rack-bars, of a hinged binding-strip adapted to contact with and lock said rack-bars, a fulcrumed lever 99, a jointed connection between the latter and said binding-strip, a trip-lever fulcrumed to said lever 99, a drawer-releasing key, a fulcrumed lever 107 contacting with the latter and means whereby the depression of said key and movement of said lever 107 produces a lifting movement of said trip-lever and a consequent movement of the lever 99 to throw the binding-strip out of contact with the rack-bars, substantially as and for the purpose specified.

23. In a cash-register, the combination with a frame, a registering mechanism, a cash-drawer, indicator-wheels, rack-bars for operating the latter, swinging frames 18ᶜ, means for operating the registering mechanism by movement of the drawer and for contributing motion from said frames to said indicator-wheels through said rack-bars, and a swinging frame 41 adapted to be moved with the drawer, of a binding-strip adapted to contact with and hold the rack-bars, a trip-lever having a shoulder 100ᵇ and adapted to control the engagement and disengagement of the binding-strip and rack-bars, said frame 41 adapted by contact with the trip-lever shoulder as the drawer is moved to a closed position and thereby cause a binding engagement of the binding-strip and rack-bars, substantially as and for the purpose specified.

24. In a cash-register, the combination of the registering mechanism, rotary indicators and means for normally holding the same against rotation, and a sliding cash-drawer, mechanism interposed between said indicators, and a cash-drawer whereby said indicators are released and operated at the opening of the drawer, and means whereby the indicators are held against rotation at the first movement of the closing of the drawer, substantially as and for the purpose specified.

25. In a cash-register, the combination of a registering mechanism, a set of amount-keys adapted to control the extent of operation of said registering mechanism, a sliding cash-drawer and means whereby the depression of a key of any set locks the remaining keys of said set against depression when the drawer is open, and connections between the parts whereby the depression of the keys of the remaining sets does not effect the registration when the drawer is open, substantially as and for the purpose specified.

26. In a registering-machine, two banks of keys, means for locking the keys in a bank when one is depressed, a drawer, and means controlled by the drawer by which the keys in the second bank remain unlocked and may be depressed but are rendered ineffectual while the said drawer is open, substantially as described.

27. The combination of cash-keys arranged in series, one series of keys for each denomination, a series of registering devices, also one for each denomination, intermediate connecting devices between each series of keys and the registering device of corresponding denomination, a common operating device adapted in its normal position to hold all the intermediate connecting devices, a locking device for each of said connecting devices adapted to be withdrawn by the operation of any key in a series when the common operating device is in its normal position, said locking device being held against disengagement when said common actuating device is moved to an unusual position whereby the cash-keys are free to move in either position of the common actuating device but affect the registering mechanism only when moved prior to the movement of the common actuating device, substantially as and for the purpose specified.

28. The combination with the registering-wheels and the cash-keys, and the intermediate yokes or bars controlled by the cash-keys and adapted to operate the registering-wheels, a common operating device for all of said yokes or bars, a lock for each of said yokes or bars adapted to be released by the action of any key in the series corresponding to said yoke or bar when the common actuating device is in a normal position, said lock being adapted to hold said yoke or bar independent of the action of said keys when the common actuating device is in an abnormal position, substantially as and for the purpose specified.

29. The combination with the cash-keys and locking device therefor, a series of registering devices and intermediate connections between the cash-keys and said registering devices, a common operating device for said intermediate connections, a connection between the common operating device and a locking device for the keys, and means, substantially as described, for imparting to said common operating device an auxiliary movement after the actuating connections have been brought to their normal position whereby the keys are released after all the other operations have been completed, substantially as specified.

30. A series of registering-wheels, pawl-levers therefor, and a common operating device for operating said pawl-levers, a stop-plate common to all of said pawl-levers, and means for moving said stop-plate into the path of the pawls of said pawl-levers when the common operating device approaches the limit of its movement, substantially as specified.

31. The combination with a series of registering-wheels, pawl-levers having pawls for operating the same, intermediate connecting devices for each of said pawl-levers, and a common actuating device for all of said connecting devices, a movable stop-plate arranged above said pawls, and means, substantially as described, for moving said stop-plate into the path of said pawls to form a stop therefor when the common actuating device approaches the limit of its stroke, substantially as specified.

32. The combination with the registers, the swinging actuating-yoke, an operating device, such as a cash-drawer, to move said yoke, and a lock for said cash-drawer, a yielding arm arranged in the path of said yoke, said arm being adapted to cushion the fall of said yoke and furnish the means for returning the locking device to its normal position as said yoke is moved, substantially as specified.

33. In a cash-register, an indicator, a swinging yoke for moving the same to its indicating position, means for locking the indicator, and a second swinging yoke for unlocking the same, substantially as described.

34. In a cash-register, a swinging actuating-yoke, a device for cushioning the downward movement of said yoke, an indicator, and means for locking the indicator, said means being operated by the cushioning device, substantially as described.

35. The combination with the registers and an intermediate actuating device such as a swinging yoke, a normally-locked movable part such as a cash-drawer to act on said yoke, normally-locked indicators, and a yielding arm in the path of said actuating-yoke and connected with the holding devices for said drawer and indicators, said arm being adapted to cushion the movement of said actuating-yoke and furnish the means for returning the holding devices for the drawer and indicator to their normal positions, substantially as specified.

36. In a cash-register, the combination with a registering mechanism, of transfer-pawls therefor, an angular plate adapted to lift said transfer-pawls, a movable lid for concealing the registering mechanism, and a spring-pressed rod connecting said lid and angular plate so that the latter is rocked to lift the transfer-pawls when the lid is opened, substantially as described.

37. In a registering-machine, a register-wheel, a movable pawl for turning said wheel, a rocking latch adjacent to the path of the pawl, and means for turning said latch to engage the pawl when it approaches the limit of its forward movement.

38. In a registering-machine, a drawer, a register-wheel, a pawl driven from said drawer for turning said wheel, and means operated by said drawer for locking the pawl to the wheel as the pawl approaches the limit of its forward movement.

39. In a registering-machine, a drawer, a registering-wheel, a pawl driven from said drawer for turning said wheel, a yoke operated by said drawer, and means operated by said yoke for locking the pawl to the wheel as the pawl approaches the limit of its forward movement.

40. In a registering-machine, a register-wheel, a movable pawl for turning the same, a swinging yoke for driving the pawl, a latch adjacent the path of the pawl, and a second yoke for moving the latch into the path of the pawl to lock the same to the wheel as it approaches the end of its movement.

41. In a registering-machine, a register-wheel, driving means for turning said wheel, a checking device for said driving means, and mechanism for moving said device into the path of the driving means as the latter approaches the limit of its movement.

HENRY S. HALLWOOD.

In presence of—
EVERETT VARIAN,
ROY BARKER.